United States Patent
Champion et al.

(10) Patent No.: US 6,292,225 B1
(45) Date of Patent: Sep. 18, 2001

(54) PRECISION HORIZONTAL POSITIONING SYSTEM

(75) Inventors: Mark A. Champion, Seattle; Micheale R. McKay, Shoreline; Donald B. Moore, Renton, all of WA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/307,152

(22) Filed: May 7, 1999

(51) Int. Cl.$^7$ ............................... H04N 5/04; H04N 9/44
(52) U.S. Cl. ..................... 348/511; 348/584; 348/598; 345/113
(58) Field of Search .............................. 348/15, 593, 585, 348/511, 565, 588, 598; 345/113–115, 340–344, 328

(56) References Cited

U.S. PATENT DOCUMENTS

| | | | |
|---|---|---|---|
| 4,591,910 | * 5/1986 | Lai et al. ............................... | 358/148 |
| 4,595,953 | * 6/1986 | Willis .................................... | 358/183 |
| 4,599,611 | * 7/1986 | Bowker et al. ....................... | 340/721 |
| 4,623,925 | * 11/1986 | Tults ..................................... | 358/183 |
| 4,638,360 | * 1/1987 | Christopher .......................... | 358/148 |
| 4,672,448 | * 6/1987 | Gioiosa ................................. | 358/148 |
| 4,931,972 | * 6/1990 | Stoddard et al. ..................... | 358/183 |
| 5,155,595 | * 10/1992 | Robinson .............................. | 358/149 |
| 5,526,017 | * 6/1996 | Wilkie .................................. | 345/115 |
| 5,602,565 | * 2/1997 | Takeuchi .............................. | 345/119 |
| 5,610,665 | * 3/1997 | Berman ................................ | 348/564 |
| 5,731,799 | * 3/1998 | Kee et al. ............................. | 345/113 |
| 6,169,533 | * 1/2001 | Tse ....................................... | 345/115 |

FOREIGN PATENT DOCUMENTS

WO 97/50242  12/1997  (WO).

* cited by examiner

*Primary Examiner*—Victor R. Kostak
(74) *Attorney, Agent, or Firm*—Skjerven Morrill MacPherson LLP; Carmen C. Cook

(57) ABSTRACT

A precision horizontal positioning (PHP) system for precisely positioning two overlaid video images includes a phase-locked loop, a frame controller, and a delay circuit. The precision horizontal positioning system adjusts the phase of a second video signal until the start of active video of the second video signal coincides with the start of active video of a first video signal. The delay circuit is incorporated in the feedback path of the horizontal synchronization signal of the second video signal such that the second video signal is pushed forward in time to align horizontally with the first video signal.

23 Claims, 6 Drawing Sheets

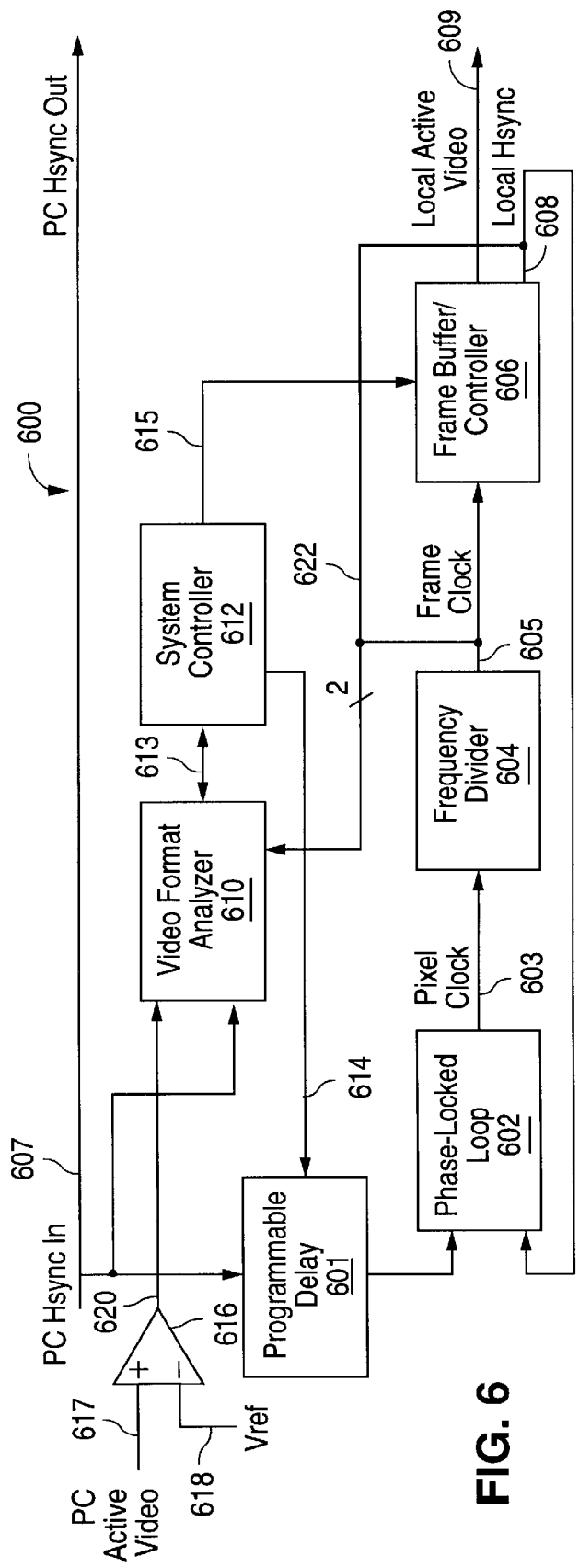
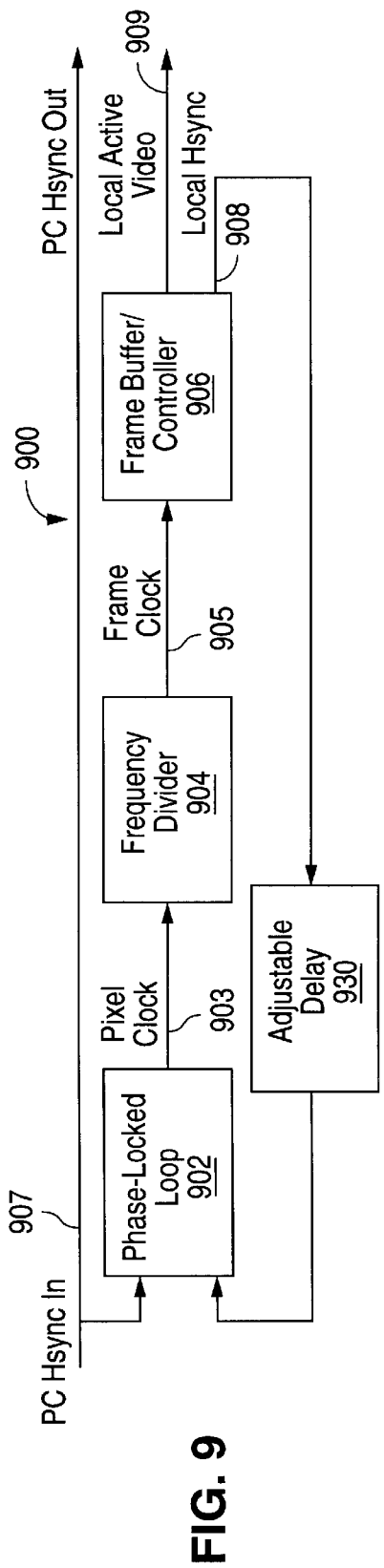
FIG. 6
FIG. 9

PRECISION HORIZONTAL POSITIONING SYSTEM

BACKGROUND OF THE INVENTION

1. Field of the Invention

The invention generally relates to video display systems; and in particular, the present invention relates to the precision horizontal alignment of video signals from multiple sources for display on a monitor.

2. Background of the Invention

In a multimedia display environment, two or more video images from separate sources are displayed on a display monitor as a composite image. For example, in a computer-based video conferencing system, motion video images from a local site or a remote site, or both, are multiplexed with computer graphic images using an analog multiplexer and displayed on a computer monitor. The video conference participants may view motion video of each other and share computer application data and information. FIG. 1 illustrates an exemplary composite image of a computer-based video conferencing system. In FIG. 1, a computer graphic image 10 generated by a personal computer (PC) is multiplexed with a motion video image 12 captured by a camera to produce a composite image 14 for display on a computer monitor (not shown). Computer graphic image 10 may include a window 16 running computer applications such as the video conferencing control application or other applications containing data shared by the conference participants. The computer graphic image 10 also includes a window 18 having a window frame 17 generated by the video conferencing control application and a blank content 19. (In FIG. 1, although blank content 19 is shown to be black, it is understood that the content is arbitrary.) To form composite image 14, blank content 19 is replaced with motion video image 12 by an analog multiplexer. The motion video data stream must be synchronized to the computer graphic image data stream. To generate a high quality composite image 14, motion video image 12 must be aligned with window frame 17 of computer graphic image 10 both horizontally and vertically.

Prior art video display systems are unsatisfactory because only coarse horizontal adjustments (4 or 8 pixels) of the overlaid images are possible. In a conventional video display system, the vertical alignment can be precise because the vertical parameters of the video signal (i.e. vertical sync frequency, start and end of vertical active video, vertical front porch, and vertical back porch) are typically adjusted in units of the horizontal scan lines. Because each scan line is one pixel in height, the vertical resolution of the video signal can be determined within a pixel accuracy.

However, horizontal alignment is more problematic because horizontal timing parameters are typically adjusted using the frame clock which has a lower resolution than the pixel clock. The lower frequency frame clock is used because the frequency of the pixel clock frequently exceeds the frequency capability of typical logic devices. Therefore, the frame clock is usually a divide by four or divide by eight of the pixel clock. The slower frame clock is used to drive logic circuits associated with the horizontal synchronization of the video signals. Because all horizontal timing events (such as horizontal sync frequency, start and end of horizontal active video) are triggered by the clocking edge of the frame clock, horizontal positioning must occur in increments of the frame clock. Therefore, the horizontal positioning of the display image cannot achieve pixel or sub-pixel range resolution.

Moreover, delays that exist in the signal path of the video synchronization signals worsen the alignment problem. FIG. 2 illustrates the timing relationship of the horizontal synchronization pulse, Hsync, and the active video signal in a conventional video system. In FIG. 2, signal line 20 is the pixel clock and signal line 22 is the frame clock. In this illustration, each period of the frame clock includes four pixel clock periods. The timing relationship between Hsync (line 24) and the start of active video (line 26) is affected by delays in both the Hsync and active video signal paths of the video system. The different signal paths for Hsync and for the active video within the video system create dissimilar delays for the signals with respect to the clocking edge of the frame clock (here, the clocking edge of the frame clock is the rising edge of the clock pulse). Because of these dissimilar delays, the timing relationship between Hsync and the start of active video is not a simple multiple of the frame clock or even the pixel clock and timing events do not coincide with the clocking edge of the frame clock or the pixel clock.

As seen in FIG. 2, Hsync (line 24) has a delay of about 0.5 pixel clocks from the clocking edge of frame clock while the start of active video (line 26) has a delay of about 3 pixel clocks. As a result, the start of Hsync and the start of active video do not coincide with the clocking edge of the frame clock. Further, the time between the start of Hsync and the start of active video is not an integer multiple of the frame clock. In FIG. 2, the time difference is about 18.5 pixel clocks which is about 4.625 frame clocks. When the time difference between Hsync and the start of active video is not an integer multiple of the frame clock and timing events do not coincide with the clocking edge of the frame clock, precise horizontal positioning of a video image is not possible because horizontal positioning must be adjusted in increments of the frame clock.

When a video conferencing system is multiplexing two video signals for display as a composite image, precise alignment of the two video signals is made difficult by the dissimilar delays in the signal paths of each of the video signals. FIG. 3 illustrates the timing relationship of two video signals, a PC video and a local video, and depicts the effect of signal path delays on the horizontal alignment of the two video signals. In FIG. 3 and in the following description, PC video (line 39) is the computer video signal and PC Hsync (line 38) is the synchronization signal for the PC video signal. Local video (line 36) is the video signal generated locally by the video conferencing system to be displayed as an overlaid image on the PC video signal. Local Hsync (line 34) is the synchronization signal for the local video.

In a conventional video display system, the delays in the signal path for the local video signal are probably different from the delays in the signal path for the PC video signal. Therefore, even though a conventional video display system can synchronize the horizontal synchronization pulses, PC Hsync and local Hsync (as indicated by the dashed line 31 in FIG. 3), the start of PC active video (line 39) and the start of local active video (line 36) are probably not synchronized and an offset δ exists between the active video signals. The offset δ is generally in the range of zero to one frame clock period because adjustments of frame controller parameters such as back porch timing can reduce δ to less than one frame clock. In the example shown in FIG. 3, the offset δ has been reduced to 2.5 pixel clocks but misalignment is still visible. Because horizontal positioning can only occur in increments of the frame clock (line 32), the PC video signal will always be misaligned from the motion video signal by the offset δ (or 1 frame clock minus δ). The image misalignment yields poor visual results. For example, in the video conferencing system, the motion video image (the window content) may become overlapped with the computer graphic image (the window frame). Although adjusting back porch timing can reduce the horizontal misalignment down to one-half frame clock or less, the result is still frequently unsatisfactory.

Therefore, there is a need to provide precise horizontal alignment of video images generated from two separate sources. The ability to make fine horizontal adjustment with a single pixel accuracy or sub-pixel accuracy is desirable. In addition, it is desirable to be able to perform the horizontal adjustment automatically.

SUMMARY OF THE INVENTION

According to the present invention, a precision horizontal positioning (PHP) system for precisely positioning two overlaid video images includes a phase-locked loop, a frame controller, and a delay circuit. The phase-locked loop has a reference frequency input terminal which is coupled to receive a first horizontal synchronization signal of a first video signal. The phase-locked loop also has a feedback frequency input terminal and a clock output terminal. When the phase-locked loop achieved a lock state, the phase-locked loop provides a synthesized pixel clock output on the clock output terminal.

The frame controller of the PHP system is coupled to receive the clock output from the phase-locked loop and provides as an output a second horizontal synchronization signal of a second video signal. In an alternate embodiment, the synthesized pixel clock from the phase-locked loop is divided by a frequency divider to generate a slower frame clock which is then coupled to the frame controller.

The delay circuit is coupled to receive the second horizontal synchronization signal from the frame controller as an input and provides an output which is coupled to the feedback frequency input terminal of the phase-locked loop. The delay circuit introduces a delay value to the second horizontal synchronization signal for adjusting the phase of the second video signal.

According to another aspect of the present invention, the delay circuit adjusts the phase of the second video signal until the second video signal is substantially horizontally aligned with the first video signal. The delay circuit can be implemented as a programmable delay circuit to enable the PHP system to perform the horizontal alignment automatically. The delay circuit can also be a user-adjustable control allowing a user to adjust the delay manually for aligning the two video signals horizontally.

In an alternate embodiment, the PHP system further includes a comparator and a video format analyzer for determining the timing parameters of the first video signal. The comparator determines when the start of active video of the first video signal occurs. The video format analyzer receives as input signals the output of the comparator, the first horizontal synchronization signal, the second horizontal synchronization signal, and the clock output from the phase-locked loop.

In an alternate embodiment, the PHP system further includes a system controller which is coupled to the video format analyzer and the delay circuit. The system controller issues commands to the video format analyzer for measuring a first time period. The system controller also issues commands to the delay circuit for introducing a delay value to the second horizontal synchronization signal.

The PHP system of the present invention is capable of provide precision horizontal alignment of video images with a single pixel or sub-pixel accuracy.

According to another aspect of the present invention, a method for horizontally aligning a first video signal and a second video signal includes the steps of: (a) causing the first video signal to create a vertical band of video data at a first edge of a display; (b) measuring a first time period between a second horizontal synchronization signal associated with the second video signal and a start of active video signal associated with the first video signal; (c) introducing a delay value to the second horizontal synchronization signal, causing the second video signal to move forward in time; (d) repeating steps (b) and (c) until the first time period increments by a first clock period; and (e) determining a first elapsed time period equaling the first time period when the first time period increments by one first clock period.

According to another embodiment of the present invention, the method for horizontally aligning a first video signal and a second video signal further includes the step of: (f) determining a second elapsed time period between the second horizontal synchronization signal and the start of active video of the second video signal.

According to yet another embodiment of the present invention, the method for horizontally aligning a first video signal and a second video signal further includes the steps of: (g) subtracting the first elapsed time period from the second elapsed time period to provide a first delay value; and (h) introducing the first delay value to the second horizontal synchronization signal, causing the second video signal to align horizontally with the first video signal.

According to yet another aspect of the present invention, a method for horizontally aligning a first video signal and a second video signal on a display includes the steps of: (a) providing a user-adjustable control for introducing a delay to a second horizontal synchronization signal associated with the second video signal; (b) adjusting the user-adjustable control to introduce a delay to the second horizontal synchronization signal, causing the second video signal to move forward in time; (c) observing the display; (d) repeating steps (b) and (c) until the first and second video signals are substantially horizontally aligned.

The present invention is better understood upon consideration of the detailed description below and the accompanying drawings.

BRIEF DESCRIPTION OF THE DRAWINGS

FIG. 6 is a block diagram of a precision horizontal positioning system according to another embodiment of the present invention.

FIG. 9 is a block diagram of a precision horizontal positioning system according to another embodiment of the present invention.

In the present disclosure, like objects which appear in more than one figure are provided with like reference numerals.

DETAILED DESCRIPTION OF THE PREFERRED EMBODIMENTS

Figure 1:
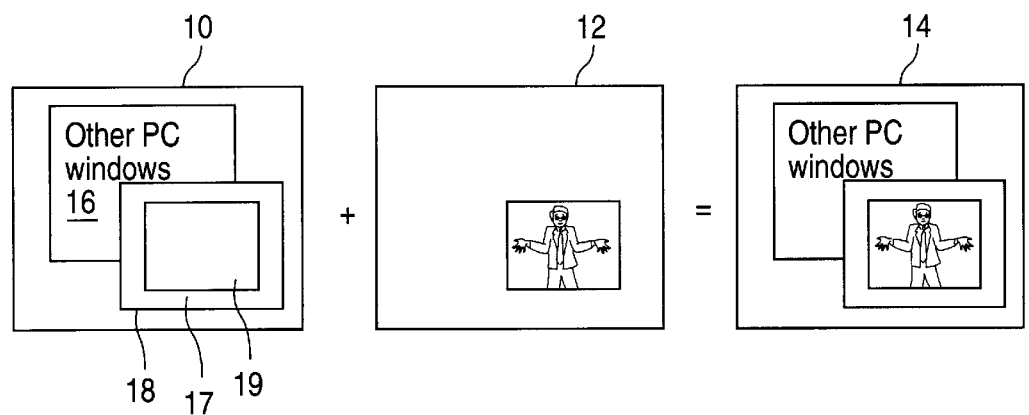
FIG. 1 illustrates a PC video image and a motion video image which are combined to form a composite image in a computer-based video conferencing application.
Figure 2:
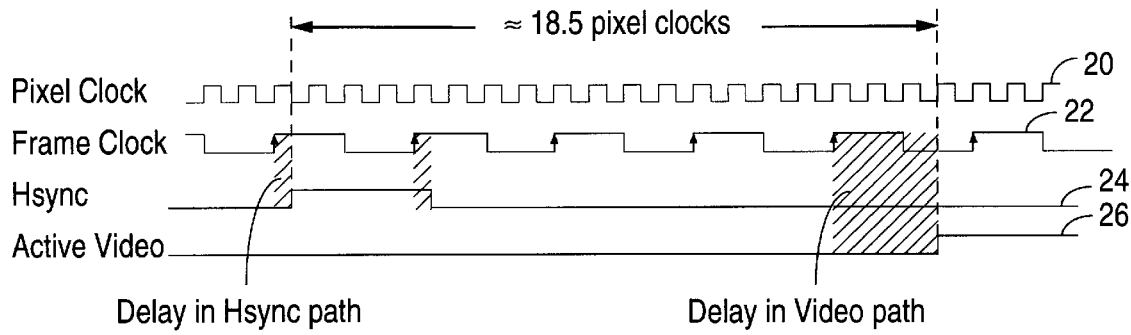
FIG. 2 is a timing diagram illustrating the delays in the signal paths for the Hsync signal and the active video signal in a conventional video display system.

In accordance with one embodiment of the present invention, a precision horizontal positioning (PHP) system for precisely aligning two overlaid video images is described. The precision horizontal positioning system aligns a first vide o signal with a second video signal by adjusting the phase of the second video signal until the start of active video of the second video signal coincides with the start of active video of the first video signal. The precision horizontal positioning system of the present invention permits two overlaid video images to be precisely aligned to produce a high quality composite image.

The precision horizontal positioning system of the present invention is implemented in a video display system where two video signals are multiplexed for display as a composite image. In the present implementation, the video display system has control over the display parameters of one of the two video signals. For example, the precision horizontal positioning system of the present invention can be implemented in a computer-based video conferencing system which multiplexes a computer video signal and a locally generated video signal for display as a composite image on a display monitor. The computer video signal (also called PC video) originates from a personal computer (PC) and is provided to the video conferencing system for direct display on the display over the PC video signal except for multiplexing the signal with the locally generated video signal and for turning the PC video on to draw a band of video at certain locations of the display. The locally generated video signal (also called local video) is the motion video images captured by a camera and processed by the video conferencing system. The video conferencing system has complete control over the signal characteristics or display parameters of the local video. One example of such a video conferencing system is described in copending and commonly assigned U.S. patent application Ser. No. 08/882,981, entitled "System and Method for Overlaying of a Motion Video Signal on an Analog Video signal" of Mark Champion and David Bessel, filed Jun. 26, 1997 which is incorporated herein by reference in its entirety.

In the description which follows, the terms "PC video" and "local video" are used to refer to the two video signals being multiplexed and displayed as overlaid video images. The use of the terms "PC video" and "local video" is illustrative only and is not intended to limit the present invention for application in a video conferencing system only. As described above, the present invention can be applied to any video display systems where two video signals are multiplexed for display as a composite image.

The term "PC video" is used merely to refer to the first video signal to be multiplexed where the video display system has no control over the display parameters of the video signal except for turning the active video on to draw a band of video at certain locations of the display. The term "local video" is used merely to refer to the second video signal to be multiplexed with the first video signal, where the second video is locally generated by the video display system and the video display system has complete control over the display parameters of the video signal.

Figure 3:
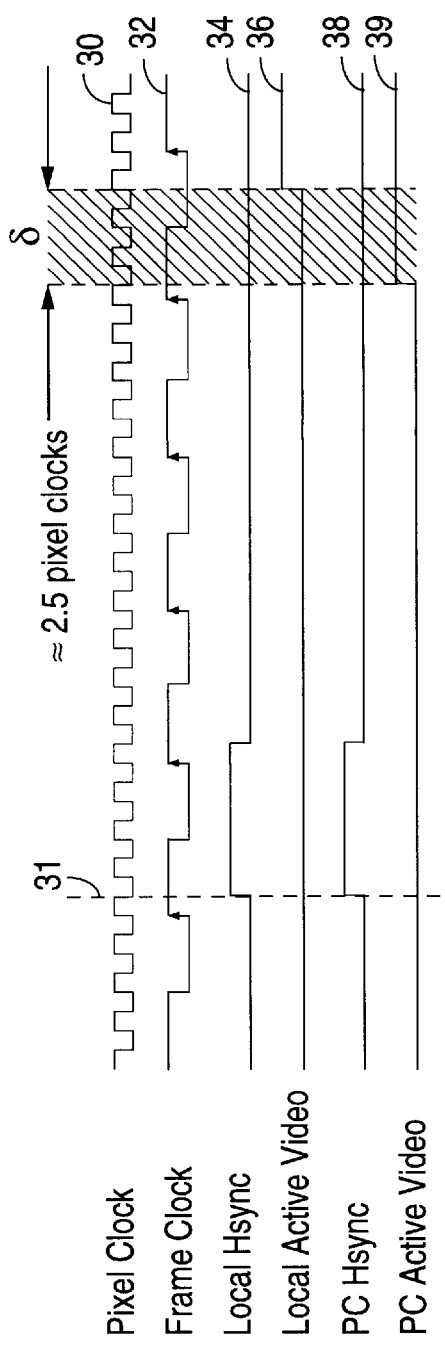
FIG. 3 is a timing diagram illustrating the timing relationship of the PC Hsync, local Hsync, PC active video and local active video in a conventional video display system with two video sources.

In order to horizontally align the PC video and the local video, the PHP system must determine the delay between the start of PC active video and the start of local active video (denoted as offset δ in FIG. 3). In the following description, the PC video and the local video are assumed to have a timing relationship as that depicted in FIG. 3 where the start of local active video is delayed in time with respect to the start of PC active video. If the timing relationship of FIG. 3 is not present at the time of horizontal adjustment, then one skilled in the art will appreciate that the back porch timing of the local video signal can be adjusted in increments of the frame clock until the timing relationship of FIG. 3 is achieved, i.e. the start of local active video occurs after the start of PC active video.

Figure 4A:
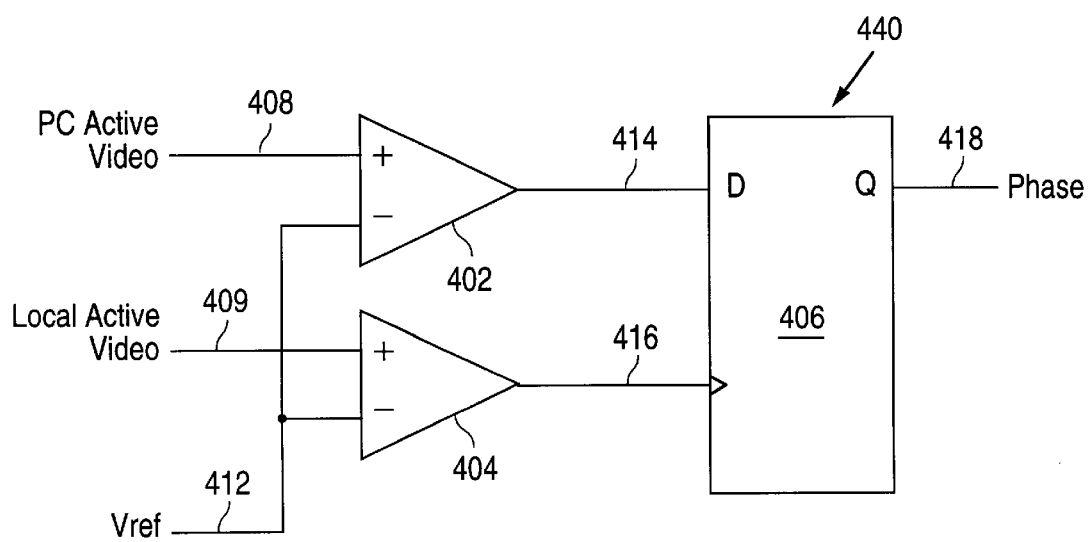
FIG. 4A is a schematic of a video compare circuit according to one embodiment of the present invention.

One method of measuring the delay between the PC active video and the local active video is to use a video compare circuit 440 illustrated in FIG. 4A according to one embodiment of the present invention. Video compare circuit 440 employs two comparators 402 and 404 to measure the delay between the start of active video of the two video signals. Comparator 402 receives the PC video signal on lead 408 which is compared with a reference voltage Vref on lead 412. The output of comparator 402 (lead 414) is connected to the data input port (D) of an D-flip-flop 406. Comparator 404 receives the local video signal on lead 409 which is compared with the reference voltage Vref on lead 412. The output of comparator 404 (lead 416) is connected to the clock input of D-flip-flop 406. The output (Q) of D-flip-flop 406 on lead 418 is a signal indicative of the phase between the PC video and the local video. The operation of video compare circuit 440 is as follows. The video display system instructs both the PC video and the local video to place a vertical band of video data at the leftmost edge of the display area. When the leading edge of the local active video on a scan line is detected by comparator 404 (i.e. when the local active video signal rises above reference voltage Vref), the clock input to D-flip-flop 406 is activated. D-flip-flop 406 then samples the data input port (D) to determine if the PC video is already present or still absent. If PC video is present, the output of comparator 402 (lead 414) is at a high logic level. The phase output 418 of flip-flop 406 will also be at a high logic level, indicating that PC active video occurs before local active video. If PC video is absent, then the output of comparator 402 (lead 414) is at a low logic level. The phase output 418 of flip-flop 406 will also be at a low logic level, indicating that PC active video occurs after local active video.

Figure 4B:
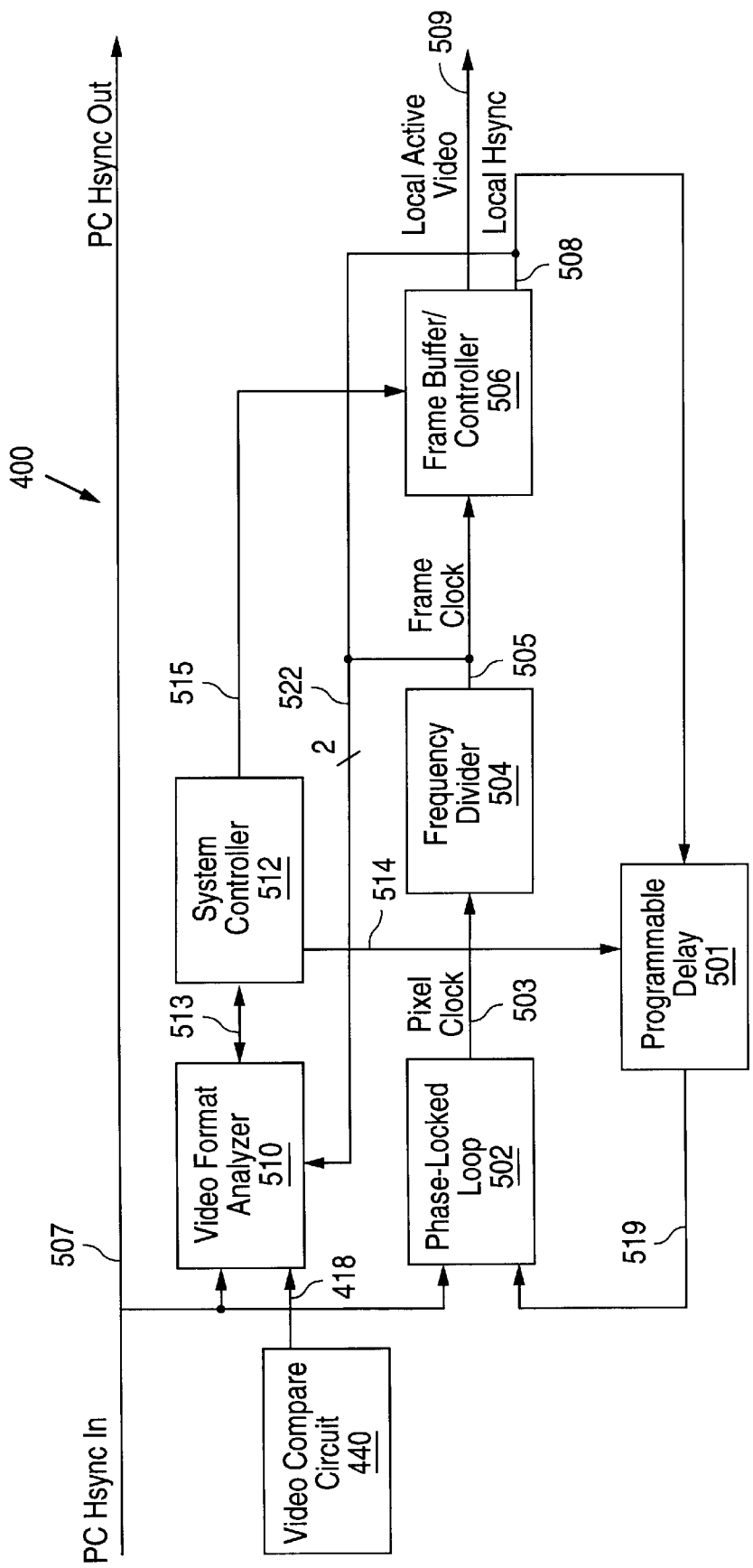
FIG. 4B is a block diagram of a precision horizontal positioning system implemented using the video compare circuit of FIG. 4A according to one embodiment of the present invention

FIG. 4B illustrates a PHP system 400 implemented using video compare circuit 440 according to one embodiment of the present invention. The construction and operation of PHP system 400 is analogous to PHP system 500 of FIG. 5 and like elements are given like reference numerals. The operation of PHP system 400 will be described in more detail below with reference to PHP system 500. Only the operation of PHP system 400 relating to voltage compare circuit 440 will be described here. Referring to FIG. 4B, phase output 418 of voltage compare circuit 440 is provided to a video format analyzer 510. Video format analyzer 510 in turn provides the phase output to a system controller 512 via a bi-directional bus 513. System controller 512 instructs a programmable delay element 501 to increase the delay in the feedback path of the local horizontal synchronization (local Hsync) signal. The delay introduced causes the local video signal to move forward in time.

As described above, at the beginning of horizontal adjustment, local video is delayed with respect to PC video (lines 36 and 39 in FIG. 3). When comparator 404 detects a rising edge on local video line 409 and D-flip-flop 406 samples its input (D), PC video is already present and phase output 418 of D-flip-flop 406 is at a high logic level. System controller 512 increases the delay in delay element 501 until phase output 418 changes from a high logic level to a low logic level, indicating that the local video signal has now moved sufficiently forward in time to coincide with the PC video signal. In this manner, PHP system 400 achieves precision alignment of the two video signals. One skilled in the art will appreciate that variations on voltage compare circuit 440 is possible to facilitate the measurement of the phase difference between the PC video and the local video.

Another method to measure the delay between the PC active video and the local active video is to use a single comparator in conjunction with the video format analyzer. The structure and operation of one embodiment of a video format analyzer which could be used in the PHP system of the present invention is described in the aforementioned U.S. patent application Ser. No. 08/882,981. In the '981 application, a video multiplexing system is described whereby a local video signal is multiplexed onto a computer video signal for display onto a computer monitor. The video multiplexing system includes a video format analyzer which analyzes and determines the timing parameters of the PC video signal. For example, the video format analyzer in the '981 application can measure back porch timing (the time from the falling edge of Hsync to the start of active video).

Figure 5:
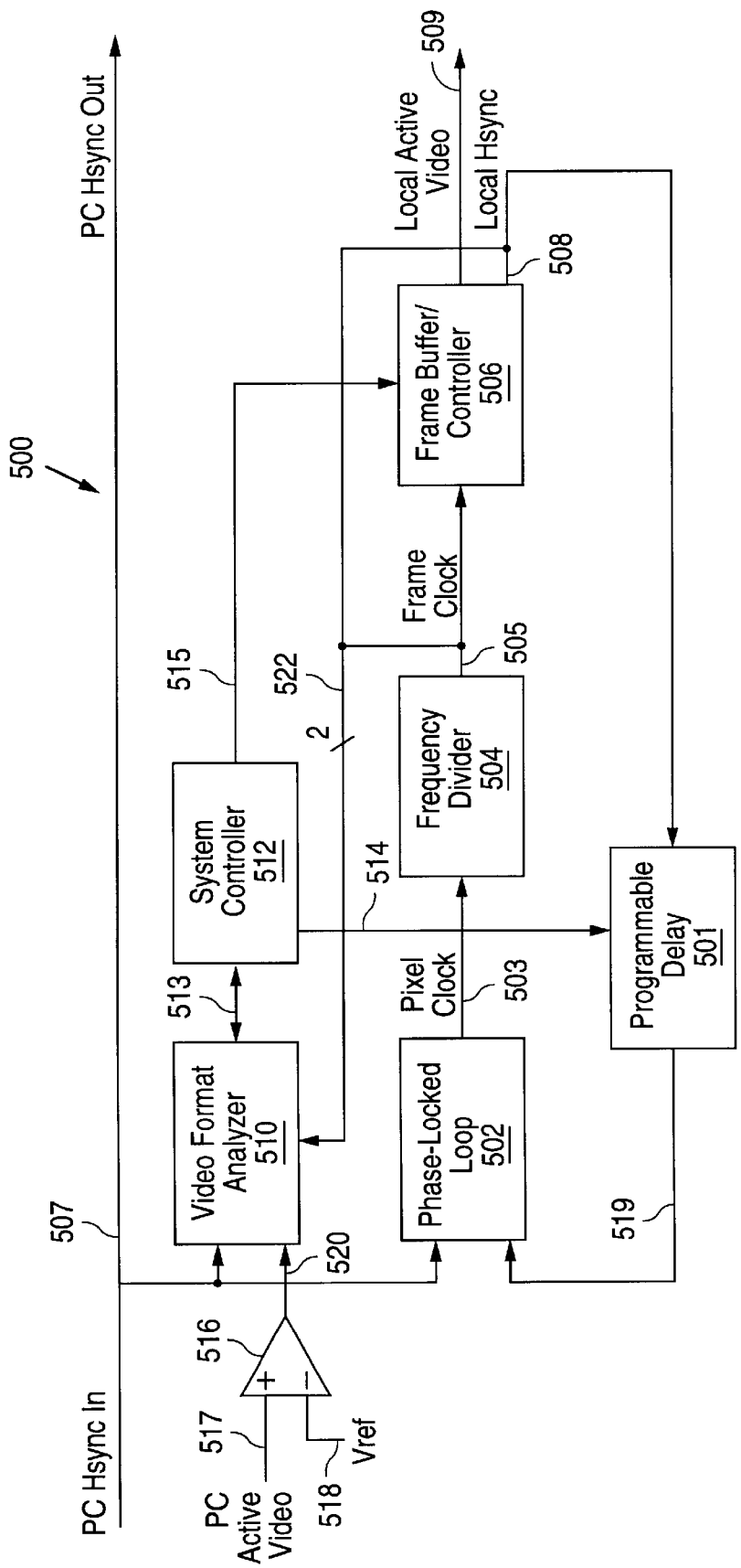
FIG. 5 is a block diagram of a precision horizontal positioning system according to another embodiment of the present invention.

FIG. 5 illustrates a precision horizontal positioning (PHP) system 500 according to another embodiment of the present invention. PHP system 500 utilizes a video format analyzer 510 for determining the delay value needed to eliminate the offset δ between the PC video signal and the local video signal. Video format analyzer 510 of the present embodiment has been enhanced to perform additional timing measurements to facilitate the horizontal alignment of video signals. PHP system 500, incorporating video format analyzer 510, permits a video display system to display overlaid video images with precise horizontal alignment.

Referring to FIG. 5, PHP system 500 includes a phase-locked loop (PLL) circuit for synchronizing the PC horizontal synchronization (PC Hsync) signal and the local horizontal synchronization (local Hsync) signal. The PLL circuit of PHP system 500 includes a phase-locked loop 502, a frequency divider 504, a frame buffer/controller 506, and a programmable delay element 501. Phase-locked loop 502 receives the PC Hsync signal as the reference frequency input. The PC Hsync signal is also outputted to the display monitor (not shown) on lead 507 for displaying the PC video signal. Phase-locked loop 502 receives the local Hsync signal, through programmable delay element 501, as the feedback frequency input on lead 519. Phase-locked loop 502 synthesizes a pixel clock from the PC Hsync signal and maintains synchronization of frame buffer/controller 506 with the PC video signal. The operation of phase-locked loop 502 is well known in the art and will not be further described. When a lock state is achieved, phase-locked loop 502 provides a synthesized pixel clock output on lead 503 which is the pixel clock recovered from the PC Hsync signal.

The synthesized pixel clock generated by phase-locked loop 502 is provided to frequency divider 504 which divides the frequency of the pixel clock to generate a frame clock on output lead 505. In the present embodiment, frequency divider 504 performs a divide by 4 function, yielding a frame clock having a frequency which is a divide by 4 of the pixel clock. It is understood that other multiples may be used, such as divide by 8. The frame clock is used to drive frame buffer/controller 506 and is the measurement time base for video format analyzer 510. Specifically, video format analyzer 510 measures timing events by counting the number of frame clock periods.

It will be appreciated that frequency divider 504 is not an essential element in PHP system 500. Frequency divider 504 is needed here merely to generate a slower frame clock for driving circuitry such as frame buffer/controller 506 which is not able to operate at the higher frequency of the pixel clock. Frequency divider 504 is not needed when logic circuitry in PHP system 500 can operate at the frequency of the pixel clock. In that case, the synthesized pixel clock output on lead 503 can be used to drive frame buffer/controller 506 directly.

Frame buffer/controller 506 performs typical frame buffer/controller tasks well known in the art and detail operation of frame buffer/controller 506 will not be further described. Relevant to the present description is that frame buffer/controller 506 generates the local Hsync signal which is fed back to phase-locked loop 502, through programmable delay element 501, for maintaining horizontal phase synchronization of the PC video signal and the local video signal. Frame buffer/controller 506 outputs the local video signal on line 509 for display on the display monitor (not shown).

PHP system 500 further includes a system controller 512 which controls video format analyzer 510, frame buffer/controller 506 and delay element 501. System controller 512 issues measurement requests to video format analyzer 510 which in response measures the timing parameters of the PC video signal. System controller 512 duplicates the measured timing parameters in frame buffer/controller 506 via lead 515.

As mentioned above, video format analyzer 510 performs specific timing measurement tasks to facilitate the horizontal alignment of the two video signals. In the present embodiment, video format analyzer 510 has been constructed to measure the time from the start of local Hsync to the start of PC active video. Referring to FIG. 5, the PC video signal is provided to a comparator 516 on lead 517 and is compared to a reference voltage Vref provided on lead 518. Comparator 516 detects a rising edge on the PC video signal and outputs a high logic level on output lead 520. Video format analyzer 510 receives the comparator output (lead 520), indicating when PC active video is present. Video format analyzer 510 also receives the local Hsync signal from frame buffer/controller 506 on lead 522. When instructed by system controller 512, video format analyzer 510 counts the number of frame clock periods occurring between the rising edge of the local Hsync signal and the rising edge of the PC video signal. The use of this measurement to effectuate horizontal alignment of the PC and local video signals will be described in more detail below in connection with FIG. 7.

The PLL circuit of the PHP system 500 incorporates programmable delay element 501 in the local Hsync feedback path 508 for introducing a delay to the local Hsync signal. The delay introduced in the local Hsync path has the effect of pushing all local video signals forward in time until the local active video signal aligns with the PC active video signal. As described above, the PC video and the local video are assumed to have a timing relationship such as that shown in FIG. 3 where the start of local active video is delayed in time with respect to the start of PC active video. PHP system 500 aligns the two video signals by moving local Hsync and local active video to the left (i.e., forward in time) until local active video coincides with PC active video. Also described above, if the timing relationship in FIG. 3 is not met, one skilled in the art will appreciate that the back porch timing of the local video signal can be adjusted to cause the local active video to occur after the PC active video.

FIG. 6 illustrates a PHP system 600 according to an alternate embodiment of the present invention. PHP system 600 includes a programmable delay element 601 in the PC Hsync signal path such that the reference frequency input to phase-locked loop 602 is delayed. In the description which follows, the operation of PHP system 500 will be described. Of course, one skilled in the art will appreciate that the operation of PHP system 600 is analogous to PHP system 500 and that PHP system 600 achieves the same precision horizontal alignment result as that of PHP system 500.

As described above, programmable delay element 501, controlled by system controller 512, introduces a delay to the local Hsync feedback path (lead 508) for adjusting the phase of the local video signal. In PHP system 500, video format analyzer 510 is included for automatically determining the proper delay value for programmable delay element 501. The use of video format analyzer 510 in PHP system 500 of the present embodiment minimizes the hardware requirement of the video display system and provides a more cost effective implementation than PHP system 400 which requires two comparators.

In the present embodiment, programmable delay element 501 is implemented as a RC delay circuit. Programmable delay element 501 provides the desired delay value corresponding to the desired delay time by adjusting its resistance. The desired resistance value for delay element 501 is computed according to the following equation for a RC delay circuit:

$$V_{th} = V_s(1 - e^{-t/rc})$$

where $V_{th}$ is the output voltage of delay element 501 and is set to be the threshold voltage of the phase comparator in phase-locked loop 502, $V_s$ is the input voltage to delay element 501 (here, the local Hsync signal from frame buffer/controller 506), r is the resistance of delay element 501, and c is the capacitance of the capacitor in delay element 501. Solving the above equation for the delay time t, t is given by:

$$t = rc\ln\frac{V_s}{V_s - V_{th}}.$$

Rewriting the equation by replacing the natural log term with a constant K, the delay time t and the resistance r are given by:

$$K = \ln\frac{V_s}{V_s - V_{th}},$$

$$r = \frac{t}{Kc}.$$

As shown by the above equation, the delay time t is a linear function of the resistance r of programmable delay element 501. Therefore, when the desired delay time t is determined, programmable delay element 501 can be programmed by setting its resistance r based on the desired delay time t as given by the above equation. In one embodiment, programmable delay element 501 is implemented as a digital potentiometer, such as the digitally controlled potentiometer (Part No. X9C102) available from Xicor, Inc. of Milpitas, Calif. The digital potentiometer value is adjusted to set the desired resistance for delay element 501 to provide the desired delay time.

Figure 7:
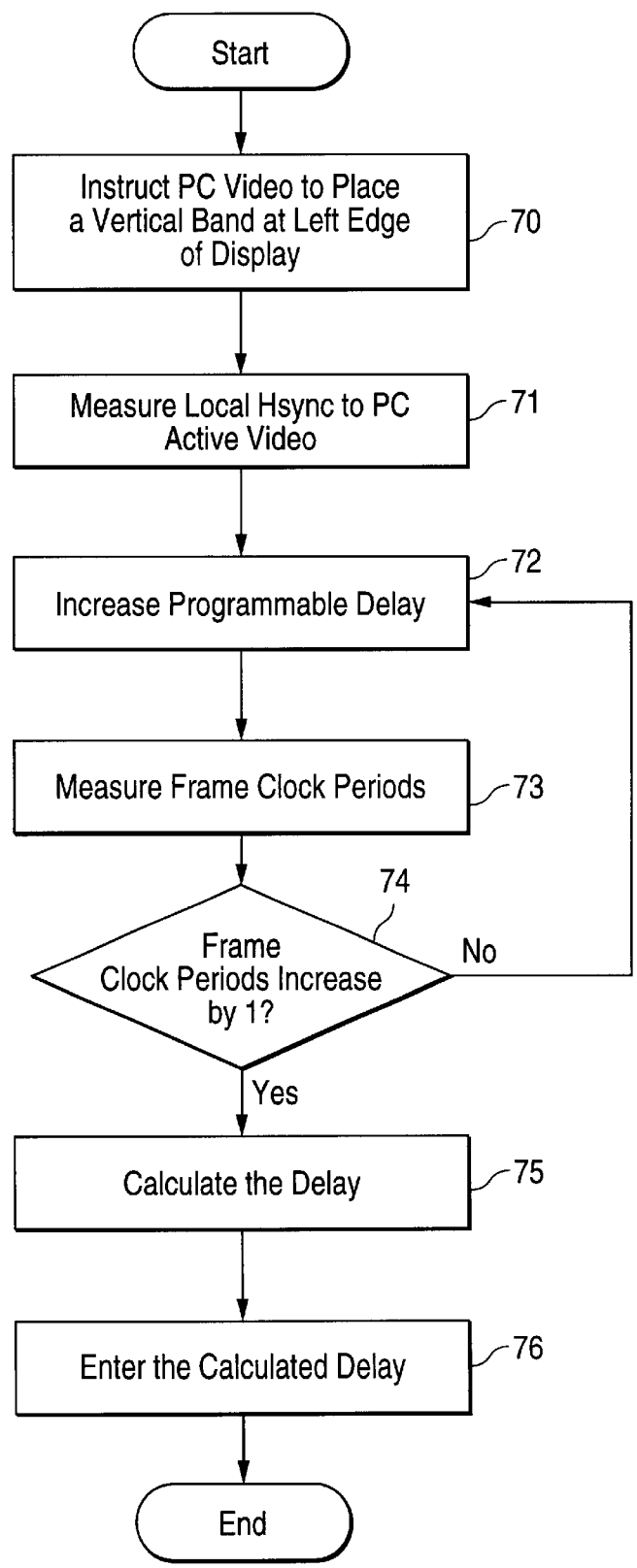
FIG. 7 is a flow chart illustrating the steps associated with determining the proper delay value for the programmable delay element in the PHP system according to one embodiment of the present invention .

The method by which PHP system 500 determines the proper delay value for programmable delay element 501 will be described with reference to the flow chart in FIG. 7. FIG. 7 is a flow chart illustrating the steps associated with automatically determining the proper delay value for programmable delay element 501 in PHP system 500 according to one embodiment of the present invention.

At the start, system controller 512 issues commands to cause the PC video signal to place a vertical band of video data at the leftmost edge of the display monitor (step 70). System controller 512 then issues a measurement request to video format analyzer 510 on bidirectional bus 513. System controller 512 instructs video format analyzer 510 to measure the time from the start of local Hsync to the start of PC active video (step 71). As described above, video format analyzer 510 conducts this measurement by counting the number of frame clock periods between the start of local Hsync and the start of PC active video. When video format analyzer 510 completes its measurement, system controller 512 reads the measured time period (i.e. the number of frame clock periods) from video format analyzer 510 on bus 513. System controller 512 instructs programmable delay element 501 on bus 514 to increase its delay value (step 72).

Referring to FIG. 3, when horizontal alignment commences, video format analyzer 510 measures five frame clock periods from the start of local Hsync and the start of PC active video. When programmable delay element 501 increases its delay value, the local active video (line 36) is shifted to the left, i.e., forward in time. In fact, delay element 501 causes synthesized pixel clock (line 30), the frame clock (line 32), and the local Hsync signal (line 34) to also shift to the left. As programmable delay element 501 increases its delay value, system controller 512 continues to instruct video format analyzer 510 to measure the number frame clock periods between the start of local Hsync and the start of PC active video (step 73). Delay element 501 increases its delay value until the frame clock periods measured by video format analyzer 510 has increased by one frame clock period (steps 72–74).

When system controller 512 detects that the frame clock periods measured by video format analyzer 510 has increased by one (step 74 in FIG. 7), the elapsed time between local Hsync to PC active video is now known (denoted as the first elapsed time). To calculate the proper delay value for programmable delay element 501, the elapsed time between local Hsync and local active video (denoted the second elapsed time) has to be determined. The proper delay value is the difference between the first elapsed time and the second elapsed time. The second elapsed time (i.e. the time between local Hsync and local active video) is a fixed system delay time including propagation delays associated with the hardware and pipeline delays associated with the video shift registers of the video display system. The fixed system delays are specific to the hardware implementation of the video display system and can be determined accurately for each implementation of the video display systems by means known in the art. Having determined the second elapsed time, the proper delay value is calculated (step 75) and the delay value is entered into programmable delay element 501 by adjusting the resistance r of delay element 501 (step 75). Precision horizontal alignment of the PC video signal and the local video signal is now achieved.

Figure 8:
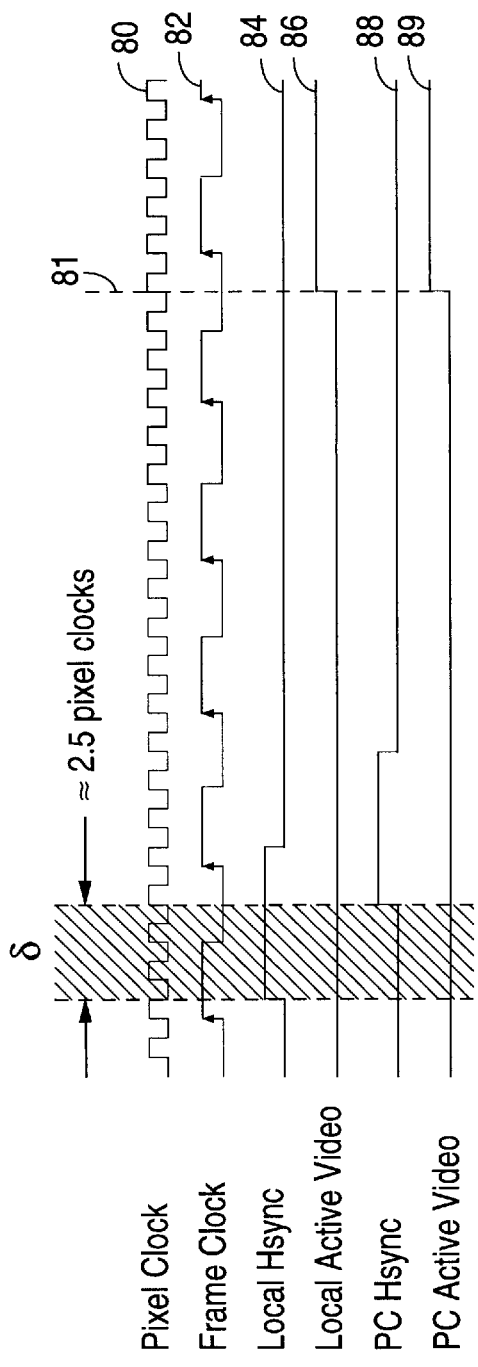
FIG. 8 is a timing diagram illustrating the timing relationship of the PC Hsync, local Hsync, PC active video and local active video after the precision horizontal alignment of the video signals in accordance with one embodiment of the present invention.

The timing relationship after PHP system 500 aligns the PC video signal and the local video signal is illustrated in FIG. 8. In FIG. 8, after the precision horizontal alignment, the local active video (line 86) and the PC active video (line 89) are aligned as indicated by the dashed line 81. Meanwhile, the local Hsync pulse (line 84) is offset from the PC Hsync pulse (line 88) by the offset δ which is about 2.5 pixel clocks in this example.

In the above embodiment, programmable delay element 501 must have a delay range of at least one frame clock or 4 pixel clocks. If the offset is greater than one frame clock, then frame buffer/controller 506 will decrement the horizontal back porch by one frame clock. In this manner, PHP system can be applied to precisely align video images having any offset value.

PHP system 500 is capable of providing precise horizontal alignment of video images within a single pixel accuracy or sub-pixel accuracy. In PHP system 500, the delay range of programmable delay element 501 determines the lowest pixel rate that PHP system 500 can support. On the other hand, the resolution of the delay increment determines the highest pixel rate that PHP system 500 can support. In one embodiment of the present invention, the delay range of delay element 501 is 170 ns and the delay increment of delay element 501 is 1.7 ns. With these values of delay range and delay increment, PHP system 500 can support a pixel rate of 25 MHz to 150 MHz with a ¼ pixel positioning accuracy or better.

The precision horizontal positioning systems described above (i.e. PHP systems 400, 500, and 600) perform precision horizontal alignment of two multiplexed video signals automatically. According to another embodiment of the present invention, the horizontal alignment of the two video signals can be performed manually by a user. FIG. 9 illustrates a precision horizontal positioning (PHP) system 900 incorporating an adjustable delay element 930. Adjustable delay element 930 can be implemented as a manual control or a button or other user-selectable means known in the art. Adjustable delay element 930 introduces a delay in the feedback path of the local Hsync signal (line 908). As described above, the delay introduced has the effect of pushing the local video signal forward in time. The user adjusts adjustable delay element 930 while observing the composite display image on the display. The user increases or decreases the delay until the two video images are aligned to the user's satisfaction.

The above detailed description are provided to illustrate the specific embodiments of the present invention and is not intended to be limiting. Numerous modifications and variations within the scope of the present invention are possible. The present invention fined by the appended claims thereto.

We claim:

1. A system for horizontally aligning a first video signal with a second video signal when said first video signal overlays said second video signal on a display, said system comprising:

a phase-locked loop having a reference frequency input terminal coupled to a first horizontal synchronization signal of said first video signal, a feedback frequency input terminal, and a clock output terminal providing a first clock signal;

a frame controller having an input terminal coupled to said clock output terminal of said phase-locked loop and an output terminal providing a second horizontal synchronization signal; and a delay circuit having an input terminal coupled to said output terminal of said frame controller and an output terminal coupled to said feedback frequency input terminal of said phase-locked loop;

wherein said delay circuit introduces a delay value to said second horizontal synchronization signal for adjusting a phase of said second video signal.

2. The system of claim 1 wherein said delay circuit adjusts said phase of said second video signal until said second video signal is substantially horizontally aligned with said first video signal.

3. The system of claim 1 further comprising:

a comparator having a non-inverting input terminal coupled to receive said first video signal, an inverting input terminal coupled to a first reference voltage, and an output terminal; and a video format analyzer having a first input terminal coupled to said first horizontal synchronization signal of said first video signal, a second input terminal coupled to said output terminal of said frame controller for receiving said second horizontal synchronization signal, a third input terminal coupled to said output terminal of said comparator, a fourth input terminal coupled to said output terminal of said phase-locked loop for receiving said first clock signal, and an input/output terminal, said video format analyzer measuring video timing parameters of said first video signal.

4. The system of claim 3 further comprising:

a system controller having an input/output terminal coupled to said input/output terminal of said video format analyzer and an output terminal coupled to said delay circuit, wherein said system controller issues commands to said video format analyzer for measuring a first time period, and issues commands to said delay circuit to introduce said delay value.

5. The system of claim 1 further comprising:

a first comparator having a non-inverting input terminal coupled to receive said first video signal, an inverting input terminal coupled to a first reference voltage, and an output terminal;

a second comparator having a non-inverting input terminal coupled to receive said second video signal, an inverting input terminal coupled to said first reference voltage, and an output terminal;

a D-flip-flop having a data input terminal coupled to said output terminal of said first comparator, a clock input terminal coupled to said output terminal of said second comparator, and an output terminal; and a video format analyzer having a first input terminal coupled to said first horizontal synchronization signal of said first video signal, a second input terminal coupled to said output terminal of said frame controller for receiving said second horizontal synchronization signal, a third input terminal coupled to said output terminal of said D-flip-flop, a fourth input terminal coupled to said output terminal of said phase-locked loop for receiving said first clock signal, and an input/output terminal, said video format analyzer measuring video timing parameters of said first video signal;

wherein said output terminal of said D-flip-flop provides a signal indicative of the phase between said first video signal and said second video signal.

6. The system of claim 5 further comprising:

a system controller having an input/output terminal coupled to said input/output terminal of said video format analyzer and an output terminal coupled to said delay circuit, wherein said system controller issues commands to said video format analyzer to monitor said signal of the phase between said first video signal and said second video signal, and issues command to said delay circuit to introduce said delay value.

7. The system of claim 1 further comprising:

a frequency divider coupled between said phase-locked loop and said frame controller;

wherein said frequency divider has an input terminal receiving said first clock signal from said phase-locked loop and an output terminal providing a second clock signal, said second clock signal having a lower frequency than said first clock signal.

8. The system of claim 1, wherein said delay circuit is a programmable delay circuit.

9. The system of claim 1, wherein said delay circuit comprises a RC delay circuit.

10. The system of claim 1, wherein said delay circuit comprises a user adjustable delay circuit.

11. A system for horizontally aligning a first video signal with a second video signal when said first video signal overlays said second video signal on a display, said system comprising:

a delay circuit having an input terminal coupled to a first horizontal synchronization signal of said first video signal and an output terminal;

a phase-locked loop having a reference frequency input terminal coupled to said output terminal of said delay circuit, a feedback frequency input terminal, and a clock output terminal providing a first clock signal; and a frame controller having an input terminal coupled to said clock output terminal of said phase-locked loop and an output terminal coupled to said feedback frequency input terminal of said phase lock loop, said output terminal providing a second horizontal synchronization signal;

wherein said delay circuit introduces a delay value to said second horizontal synchronization signal for adjusting a phase of said second video signal.

12. The system of claim 11 wherein said delay circuit adjusts said phase of said second video signal until said second video signal is substantially horizontally aligned with said first video signal.

13. The system of claim 11 further comprising:

a comparator having a non-inverting input terminal coupled to receive said first video signal, an inverting input terminal coupled to a first reference voltage, and an output terminal; and a video format analyzer having a first input terminal coupled to said first horizontal synchronization signal of said first video signal, a second input terminal coupled to said output terminal of said frame controller for receiving said second horizontal synchronization signal, a third input terminal coupled to said output terminal of said comparator, a fourth input terminal coupled to said output terminal of said phase-locked loop for receiving said first clock signal, and an input/output terminal, said video format analyzer measuring video timing parameters of said first video signal.

14. The system of claim 13 further comprising:

a system controller having an input/output terminal coupled to said input/output terminal of said video format analyzer and an output terminal coupled to said delay circuit, wherein said system controller issues commands to said video format analyzer for measuring a first time period, and issues commands to said delay circuit to introduce said delay value.

15. The system of claim 11 further comprising:

a frequency divider coupled between said phase-locked loop and said frame controller;

wherein said frequency divider has an input terminal receiving said first clock signal from said phase-locked loop and an output terminal providing a second clock signal, said second clock signal having a lower frequency than said first clock signal.

16. The system of claim 11, wherein said delay circuit is a programmable delay circuit.

17. The system of claim 11, wherein said delay circuit comprises a RC delay circuit.

18. The system of claim 11, wherein said delay circuit comprises a user adjustable delay circuit.

19. A method for horizontally aligning a first video signal with a second video signal, said first video signal overlaying said second video signal on a display, said method comprising the steps of:

causing said first video signal to create a vertical band of video data at a first edge of said display;

measuring a first time period between a horizontal synchronization signal associated with said second video signal and a start of active video signal associated with said first video signal;

introducing a delay value to said horizontal synchronization signal of said second video signal, causing said second video signal to move forward in time;

repeating said steps of measuring said first time period and introducing said delay value until said first time period increments by a first clock period; and determining a first elapsed time period equaling said first time period when said first time period increments by said first clock period.

20. The method of claim 19 further comprising the step of:

determining a second elapsed time period between said horizontal synchronization signal of said second video signal and a start of active video of said second video signal.

21. The method of claim 20 further comprising the steps of:

subtracting said first elapsed time period from said second elapsed time period to provide a first delay value; and introducing said first delay value to said horizontal synchronization signal of said second video signal, causing said second video signal to align horizontally with said first video signal.

22. A method for horizontally aligning a first video signal with a second video signal, said first video signal overlaying said second video signal on a display, said method comprising the steps of:

causing said first video signal and said second video signal to create a vertical band of video data at a first edge of said display;

detecting an active video signal of said second video signal;

monitoring an active video signal of said first video signal;

determining a signal value indicative of the phase between said first video signal and said second video signal, said signal value having a first value;

introducing a delay value to a horizontal synchronization signal associated with said second video signal, causing said second video signal to move forward in time; and repeating said steps of monitoring said active video, determining said signal value and introducing said delay value until said signal value changes to a second value.

23. A method for horizontally aligning a first video signal with a second video signal, said first video signal overlaying said second video signal on a display, said method comprising the steps of:

providing a user-adjustable control for introducing a delay to a horizontal synchronization signal associated with said second video signal;

adjusting said user-adjustable control to introduce a delay to said horizontal synchronization signal of said second video signal, causing said second video signal to move forward in time;

observing said display; and repeating said steps of adjusting said user-adjustable control and observing said display until said first and second video signals are substantially horizontally aligned.

* * * * *